United States Patent
Naka et al.

(10) Patent No.: US 6,391,976 B1
(45) Date of Patent: May 21, 2002

(54) PROCESSING AID FOR FOAM MOLDING USE AND VINYL CHLORIDE RESIN COMPOSITION CONTAINING THE SAME

(75) Inventors: Naho Naka, Okayama; Akira Nakata; Shigeo Wakabayashi, both of Hiroshima; Seiji Takei, Kanagawa, all of (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/622,055

(22) PCT Filed: Feb. 23, 1999

(86) PCT No.: PCT/JP99/00810

§ 371 Date: Dec. 4, 2000

§ 102(e) Date: Dec. 4, 2000

(87) PCT Pub. No.: WO99/43741

PCT Pub. Date: Sep. 2, 1999

(30) Foreign Application Priority Data

Feb. 24, 1998 (JP) ............................................ 10-042191

(51) Int. Cl.$^7$ ................................................ C08L 27/06

(52) U.S. Cl. ....................................................... 525/239

(58) Field of Search ......................................... 525/239

(56) References Cited

FOREIGN PATENT DOCUMENTS

| JP | 57-30735 | * | 2/1982 |
| JP | 6-192457 | * | 7/1994 |
| JP | 8-169914 | * | 7/1996 |

* cited by examiner

*Primary Examiner*—Terressa M. Boykin
(74) *Attorney, Agent, or Firm*—Oblon, Spivak, McClelland, Maier & Neustadt, P.C.

(57) ABSTRACT

A processing aid (B) for foam molding use which comprises a powdered copolymer composed of 50 to 80% by weight of methyl methacrylate, 20 to 50% by weight of an alkyl methacrylate having an alkyl group of 3 to 5 carbon atoms, and 0 to 20% by weight of other copolymerizable monomers, the copolymer having a reduced viscosity ($\eta_{sp}/c$) of 4 to 8. Use of this processing aid permits vinyl chloride resins to be kneaded efficiently and imparts an increased melt strength thereto, so that fine and uniform foamed cells can be formed and, moreover, a high foaming ratio and an attractive molding appearance can be achieved.

8 Claims, No Drawings

PROCESSING AID FOR FOAM MOLDING USE AND VINYL CHLORIDE RESIN COMPOSITION CONTAINING THE SAME

TECHNICAL FIELD

This invention relates to a processing aid for foam molding use and vinyl chloride resin compositions using the same. More particularly, it relates to a processing aid for foam molding use which can improve the foam moldability of vinyl chloride resin compositions, and vinyl chloride resin compositions using the same.

BACKGROUND ART

Since vinyl chloride resins not only have excellent properties such as chemical resistance, impact resistance and weather resistance, but also are inexpensive, they are being widely used as general-purpose resin materials of great utility value. Foam molding is one of their preferable uses and, for example, attempts are being made to produce foam-molded products useful as building components aiming at synthetic wood and the like. However, if a foam molded product is made from just a vinyl chloride resin, sufficient elongation characteristics and melt strength cannot be obtained at the molding temperature commonly employed for vinyl chloride resins, so that it is impossible to form a uniform foamed cell structure and achieve any desired high foaming ratio. Thus, it has been difficult to produce satisfactory foam-molded products. Moreover, since vinyl chloride resins have a narrow range of allowable molding conditions, it has also been difficult to produce satisfactory foam-molded products solely by modifying the molding conditions.

In order to improve the foam moldability of such vinyl chloride resins, there have heretofore been proposed various methods which involve adding a high-molecular-weight acrylic resin for the main purpose of imparting melt strength thereto.

However, with the recent spread and extension of the foam molding of vinyl chloride resins, there is a growing demand for foam-molded products having more excellent moldability and an attractive molding appearance.

DISCLOSURE OF THE INVENTION

An object of the present invention is to provide a processing aid for foam molding use which permits vinyl chloride resin compositions to be melted and kneaded efficiently and imparts an increased melt strength thereto, so that fine and uniform foamed cells required for vinyl chloride resin-based foam molding compositions can be formed, a high foaming ratio can be achieved, and an attractive molding appearance can be produced, as well as vinyl chloride resin-based foam molding compositions using the same.

The present inventors made intensive investigations with a view to solving the above-described problem. As a result, it has now been found that the foam moldability of vinyl chloride resins can be improved by adding thereto a processing aid for foam molding use comprising a powder of a methacrylic ester copolymer having a specific weight-average molecular weight and a specific monomer composition. Moreover, it has also be found that, when this processing aid for foam molding use comprises a powder formed by spray drying so that the proportion of particles whose inner part has fused into a homogeneous state is less than 50% by weight, molded products having a uniform cell structure can be obtained even at a high foaming ratio. The present invention has been completed on the basis of these findings.

In order to improve the foam moldability of vinyl chloride resin-based foam molding compositions, it is necessary to melt and knead the vinyl chloride resin compositions efficiently. One method for melting and kneading vinyl chloride resin compositions efficiently comprises adding a high-molecular-weight acrylic resin thereto. It is described in Japanese Patent Laid-Open No. 169914/'96 that spray-dried acrylic resin powders having different surface conditions (i.e., a spray-dried acrylic resin powder comprising particles whose surface is closely united to form a smooth surface, and a spray-dried acrylic resin powder comprising particles in which primary particles derived from the dispersion and gathered together are distinctly recognized) show a difference in the effect of promoting the melting and kneading of vinyl chloride resins. Specifically, the spray-dried acrylic resin powder comprising particles in which primary particles derived from the dispersion and gathered together are distinctly recognized is said to be more suitable for the purpose of promoting the melting and kneading of vinyl chloride resins. In this connection, however, all that is described therein is that an acrylic processing aid suitable for the production of drink bottles comprising a vinyl chloride resin can be prepared. In order to improve the foam moldability of vinyl chloride resin compositions, it is necessary that not only the surface condition of particles formed by spray drying, but also the composition and molecular weight of the processing aid are suitable for the foam molding of the vinyl chloride resin compositions. In this respect, the present invention is different from the above-described prior art.

That is, the present invention relates to a processing aid (B) for foam molding use which comprises a powdered copolymer composed of 50 to 80% by weight of methyl methacrylate, 20 to 50% by weight of an alkyl methacrylate having an alkyl group of 3 to 5 carbon atoms, and 0 to 20% by weight of other copolymerizable monomers, the copolymer having a reduced viscosity ($\eta_{sp}/c$) of 4 to 8.

The present invention also relates to a vinyl chloride resin-based foam molding composition comprising 100 parts by weight of a vinyl chloride resin (A) and 1 to 25 parts by weight of the aforesaid processing aid (B) for foam molding use.

BEST MODE FOR CARRYING OUT THE INVENTION

The processing aid (B) for foam molding use in accordance with the present invention comprises a powder of a copolymer obtained by the polymerization of methyl methacrylate, an alkyl methacrylate having an alkyl group of 3 to 5 carbon atoms, and other copolymerizable monomers. The content of methyl methacrylate is in the range of 50 to 80% by weight and preferably 60 to 80% by weight. If its content is less than 50% by weight, it will be impossible to melt and knead the vinyl chloride resin-based foam molding composition efficiently as desired in the present invention, and it will hence become difficult to produce a fine and uniform foamed cell structure and achieve a high foaming ratio. Moreover, the step of recovering the processing aid for foam molding use as a powder may encounter blocking with the powder, or the compound obtained by its blending with a vinyl chloride resin may show a reduction in bulk specific gravity. If its content is greater than 80% by weight, the resulting molded product will have a poor molding appearance.

Examples of the alkyl methacrylate having an alkyl group of 3 to 5 carbon atoms, which is used in the present invention, include propyl methacrylate, butyl methacrylate and pentyl methacrylate. Among others, n-butyl methacrylate is preferred. These alkyl methacrylates may be used alone or in admixture of two or more, depending upon the intended purpose. The content of the alkyl methacrylate having an alkyl group of 3 to 5 carbon atoms is in the range of 20 to 50% by weight and preferably 20 to 40% by weight. If its content is less than 20% by weight, the resulting molded product will have a poor molding appearance. If its content is greater than 50% by weight, it will be impossible to melt and knead the vinyl chloride resin-based foam molding composition efficiently as desired in the present invention, and it will hence become difficult to produce a uniform foamed cell structure and achieve a high foaming ratio. Moreover, the step of recovering the processing aid for foam molding use as a powder may encounter blocking with the powder, or the compound obtained by its blending with a vinyl chloride resin may show a reduction in bulk specific gravity.

Examples of the other monomers copolymerizable therewith include acrylic esters such as ethyl acrylate, n-butyl acrylate, 2-ethylhexyl acrylate, benzyl acrylate and phenyl acrylate; aromatic vinyl compounds such as styrene, α-methylstyrene and vinyltoluene; vinyl cyanide compounds such as acrylonitrile and methacrylonitrile; vinyl esters such as vinyl acetate; and acid anhydrides such as maleic anhydride. However, it is to be understood that the present invention is not limited to these specific examples. These other copolymerizable monomers may also be used alone or in admixture of two or more, depending upon the intended purpose. If the content of these other copolymerizable monomers is greater than 20% by weight, it will be impossible to melt and knead the vinyl chloride resin-based foam molding composition efficiently as desired in the present invention, and it will hence become difficult to produce a fine and uniform foamed cell structure and achieve a high foaming ratio.

Moreover, multifunctional monomers such as divinylbenzene, allyl methacrylate, 1,3-butanediol dimethacrylate and triallyl cyanurate may be used as constituents of the processing aid (B) for foam molding use in accordance with the present invention. The content of these monomeric units is in the range of 0.1 to 2.0% by weight and preferably 0.2 to 1.0% by weight. If the content of these multifunctional monomers is greater than 2.0% by weight, they will undesirably interfere with the purposes of the processing aid (B) for foam molding use in accordance with the present invention, i.e., the formation of fine and uniform foamed cells and the provision of a good molding appearance.

In order for the processing aid (B) for foam molding use to exhibit its excellent effects, it is important that the above-described alkyl methacrylate copolymer serving as the processing aid for foam molding use have a properly high molecular weight. That is, it is important that the above-described alkyl methacrylate copolymer have a reduced viscosity ($\eta_{sp}/c$) of 4 to 8 and preferably 5 to 8. The term "reduced viscosity ($\eta_{sp}/c$)" as used herein refers to a value obtained by dissolving 0.1 g of a (co)polymer in 100 ml of chloroform and measuring the viscosity of this solution at 25° C. In order to control the reduced viscosity (72 $_{sp}/c$) of the processing aid (B) for foam molding use, there may be employed any of common known methods such as regulation of the amounts of chain-transfer agent and initiator used during polymerization and regulation of the polymerization temperature. If the reduced viscosity ($\eta_{sp}/c$) of the processing aid (B) for foam molding use in accordance with the present invention is less than 4, its melt strength-imparting effect will be reduced and, therefore, a molded product having a high foaming ratio cannot be obtained. If its reduced viscosity ($\eta_{sp}/c$) is greater than 8, its melt strength-imparting effect will become so powerful that the molded product will have a poor molding appearance.

In order to prepare the processing aid (B) for foam molding use in accordance with the present invention, there may be employed various methods. For example, useful polymerization techniques include emulsion polymerization, suspension polymerization, solution polymerization and the like. Moreover, the monomers may be added at a time, dropwise or in portions, and either random copolymerization or block copolymerization technique may be employed. However, it is preferable to use a random copolymer obtained by adding the monomers at a time.

When emulsion polymerization is employed, no particular limitation is placed on the type of the emulsifier used therefor, and various emulsifiers may be used. They include, for example, anionic surface-active agents such as fatty acid salts, alkylsulfate salts, alkylbenzenesulfonate salts, alkylphosphate salts and dialkylsulfosuccinate salts; nonionic surface-active agents such as polyoxyethylene alkyl ethers, polyoxyethylene fatty acid esters, sorbitan fatty acid esters and glycerol fatty acid esters; and cationic surface-active agents such as alkylamine salts. These emulsifiers may be used alone or in combination.

Depending upon the type of the emulsifier used, the pH of the polymerization system may become alkaline. In such a case, a suitable pH regulator may be used in order to prevent the hydrolysis of the alkyl methacrylate. Usable pH regulators include boric acid-potassium chloride-potassium hydroxide, potassium dihydrogen phosphate-disodium hydrogen phosphate, boric acid-potassium chloride-potassium carbonate, citric acid-potassium hydrogen citrate, potassium dihydrogen phosphate-borax, sodium dihydrogen phosphate-citric acid, and the like.

The polymerization initiator may be selected from among water-soluble or oil-soluble sole initiators and redox initiators. For example, common inorganic initiator such as persulfates may be used alone, or used as redox initiators by combining them with a sulfite, hydrogen sulfite, thiosulfate or the like. Moreover, organic peroxides (e.g., t-butyl hydroperoxide, cumene hydroperoxide, benzoyl peroxide and lauroyl peroxide), azo compounds and the like may be used alone, or used as redox initiators by combining them with sodium formaldehyde sulfoxylate or the like. However, it is to be understood that the present invention is not limited to these specific examples.

Where the processing aid (B) for foam molding use in accordance with the present invention is prepared, for example, by emulsion polymerization, the product may be recovered by cooling the resulting alkyl methacrylate polymer latex, precipitating the polymer by acid coagulation or salting-out with an electrolyte such as an acid (e.g., sulfuric acid, hydrochloric acid or phosphoric acid) or a salt (e.g., aluminumchloride, calciumchloride, magnesium sulfate, aluminum sulfate or calcium acetate), filtering off the precipitate, and washing and drying it. Alternatively, the product may also be recovered by subjecting the resulting polymer latex to various processes such as spray drying and freeze-drying. However, spray drying is preferred in order that, when the resulting processing aid (B) for foam molding use is used in a vinyl chloride resin-based foam molding composition, the formation of fine and uniform foamed cells may be promoted and a good molding appearance may be obtained. Although no particular limitation is placed on the conditions of spray drying, it is preferable that the particles formed thereby meet the requirements described below. That is, spray drying may be carried out under any desired conditions that permit the formation of such particles.

Specifically, it is preferable that, in the powder formed by spray drying, the content of particles whose inner part has fused into a homogeneous state be less than 50% by weight and more preferably less than 25% by weight. If the content of such particles is greater than 50% by weight, the range of molding conditions which makes it possible to achieve a uniform foamed cell structure and a high foaming ratio as desired in the present invention will tend to become narrower. Moreover, the compound obtained by its blending with a vinyl chloride resin may show a reduction in bulk specific gravity.

No particular limitation is placed on the type of the vinyl chloride resin (A) used in the present invention. sable vinyl chloride resins include, for example, vinyl chloride homopolymer, post-chlorinated vinyl chloride polymers, partially crosslinked vinyl chloride polymers, vinyl chloride copolymers containing less than 30% by weight of other vinyl compounds copolymerizable with vinyl chloride, and mixtures thereof. No particular limitation is placed on the types of the aforesaid other vinyl compounds copolymerizable with the vinyl chloride component. Specific examples thereof include fatty acid vinyl esters such as vinyl acetate and vinyl propionate; alkyl methacrylates such as methyl methacrylate and ethyl methacrylate; α-olefins such as ethylene, propylene and styrene; alkyl vinyl ethers such as vinyl methyl ether and vinyl butyl ether; and unsaturated carboxylic acids and anhydrides thereof, such as acrylic acid, methacrylic acid and maleic anhydride. These other copolymerizable vinyl compounds may be used alone or in admixture of two or more. If the amount of the aforesaid other copolymerizable vinyl compounds is greater than 30% by weight, the intrinsic features of the vinyl chloride resin will be detracted from. Moreover, these vinyl chloride resins may be used alone or in admixture of two or more.

The average degree of polymerization of the vinyl chloride resin (A) used in the present invention is preferably in the range of 300 to 5,000 and more preferably 500 to 3,000. If its average degree of polymerization is less than 300, the foaming ratio will be reduced and the resulting foam will tend to show a reduction in mechanical properties. If its average degree of polymerization is greater than 5,000, the resulting foam molding composition will tend to show a reduction in processability.

No particular limitation is placed on the process for producing the vinyl chloride resin (A) used in the present invention, and there may be used any of the vinyl chloride resins produced by various polymerization processes such as emulsion polymerization, suspension polymerization and bulk polymerization.

The vinyl chloride resin-based foam molding composition of the present invention comprises 100 parts by weight of the vinyl chloride resin (A) and 1 to 25 parts by weight, preferably 5 to 15 parts by weight, of the processing aid (B) for foam molding use. If the amount of the processing aid (B) for foam molding use is less than 1 part by weight, its melt strength-imparting effect will be reduced and it will hence be impossible to produce a foam-molded product having a fine and uniform foamed cell structure, a high foaming ratio, and a good molding appearance. If the amount of the processing aid (B) for foam molding use is greater than 25 parts by weight, the molded product will have a poor molding appearance.

No particular limitation is placed on the method for preparing the vinyl chloride resin-based composition of the present invention, and there may be employed any commonly known melt kneading method. For example, a foam molding composition may be prepared by blending a specified amount of the vinyl chloride resin (A) with a specified amount of the processing aid (B) for foam molding use in a Henschel mixer, Banbury mixer, V-type mixer, ribbon blender or the like, and passing the resulting blend through a kneading and extruding machine such as such as a single-screw or twin-screw extruder. Thus, the foam molding composition may be prepared in any of various desired forms. In foam molding, the vinyl chloride resin-based foam molding composition of the present invention may be applied to any of various foam molding processes such as free foam molding and CERCA foam molding.

When the vinyl chloride resin composition of the present invention is prepared by blending the vinyl chloride resin (A) with the processing aid (B) for foam molding use, not only foaming agents, but also various conventional additives such as stabilizers, lubricants, fillers, impact modifiers and flame retardants may optionally be added according to the intended purpose, so long as the effects of the present invention are not detracted from.

Usable foaming agents include, for example, azo type foaming agents such as azobisisobutyronitrile and azodicarbonamide; nitroso type foaming agents such as N,N'-dinitrosopentamethylenetetramine and N,N'-dimethyl-N,N'-dinitrosoterephthalamide; and inorganic foaming agents such as sodium hydrogen carbonate. These foaming agents may be used alone or in admixture of two or more.

Usable stabilizers include, for example, lead-based stabilizers such as tribasic lead sulfate, dibasic lead phosphite, basic lead sulfite and lead silicate; metal soap type stabilizers derived from a metal such as potassium, magnesium, barium, zinc, cadmium or lead, and a fatty acid such as 2-ethylhexanoic acid, lauric acid, myristic acid, palmitic acid, stearic acid, isostearic acid, hydroxystearic acid, oleic acid, ricinolic acid, linolic acid or behenic acid; organic tin type stabilizers having an alkyl group, ester group, fatty acid group, maleic acid group, sulfide-containing group, or the like; compound metal soap type stabilizers such as Ba—Zn, Ca—Zn, Ba—Ca—Sn, Ca—Mg—Sn, Ca—Zn—Sn, Pb—Sn and Pb—Ba—Ca type metal soaps; metallic salt type stabilizers derived from a metal radical such as barium or zinc, and usually two or more organic acids selected from branched fatty acids (e.g., 2-ethylhexanoic acid, isodecanoic acid and trialkylacetic acid), unsaturated fatty acids (e.g., oleic acid, ricinolic acid and linolic acid), alicyclic acids (e.g., naphthenic acid) and aromatic acids (e.g., carbolic acid, benzoic acid, salicylic acid and their substituted derivatives); and metallic salt type liquid stabilizers prepared by dissolving one of the foregoing stabilizers in an organic solvent such as a petroleum hydrocarbon, alcohol or glycerol derivative, and adding thereto one or more stabilizing assistants selected from phosphorous esters, epoxy compounds, anti-coloring agents, transparency modifiers, light stabilizers, anti-bleedout agents, lubricants and the like. In addition to these metallic stabilizers, usable stabilizers also include nonmetallic stabilizers such as epoxy compounds (e.g., epoxy resins, epoxidized soybean oil, epoxidized vegetable oils and epoxidized fatty acid alkyl esters) and organic phosphorous esters. These stabilizers may be used alone or in admixture of two or more.

Usable lubricants include, for example, pure hydrocarbon lubricants such as liquid paraffin, natural paraffin, microcrystalline wax, synthetic paraffin and low-molecular-weight polyethylene; halogenated hydrocarbon lubricants; fatty acid lubricants such as higher fatty acids and hydroxy-fatty acids; fatty acid amide lubricants such as fatty acid amides and bis (fatty acid amide)s; and ester lubricants such as lower alcohol esters of fatty acids, polyhydric alcohol esters of fatty acids (e.g., glycerides), polyglycol esters of fatty acids, and fatty alcohol esters of fatty acids (i.e., ester waxes). In addition, the also include metal soaps, fatty alcohols, polyhydric alcohols, polyglycols, polyglycerols, partial esters derived from fatty acids and polyhydric alcohols, and partial esters derived from fatty acids and polyglycols or polyglycerols. These lubricants may be used alone or in admixture of two or more.

Usable fillers include, for example, carbonates such as ground calcium carbonate, precipitated calcium carbonate and colloidal calcium carbonate; inorganic fillers such as aluminum hydroxide, magnesium hydroxide, titanium oxide, clay, mica, talc, wollastonite, zeolite, silica, zinc oxide, magnesium oxide, carbon black, graphite, glass beads, glass fiber, carbon fiber and metal fibers; and organic fibers such as polyamide fibers. These fillers may be used alone or in admixture of two or more.

Where impact modifiers are added, usable impact modifiers include, for example, polybutadiene, polyisoprene, polychloroprene, fluororubbers, styrene-butadiene copolymer rubber, acrylonitrile-styrene-butadiene copolymer rubber, styrene-butadiene-styrene block copolymer rubber, styrene-isoprene-styrene block copolymer rubber, styrene-ethylene-butylene-styrene block copolymer rubber, ethylene-propylene copolymer rubber and ethylene-propylene-diene copolymer rubber (EPDM). As the diene of EPDM, there may be used 1,4-hexadiene, dicyclopentadiene, methylenenorbornene, ethylidenenorbornene, propenylnorbornene and the like. These impact modifiers may be used alone or in admixture of two or more.

In addition, flame retardants (e.g., chlorinated paraffin, aluminum hydroxide, antimony trioxide and halogen compounds), mold-releasing agents, fluidity modifiers, coloring agents, antistatic agents, antifogging agents, antimicrobial agents and the like may optionally be added according to the intended purpose, so long as the effects of the present invention are not detracted from.

The vinyl chloride resin-based foam molding compositions thus obtained may be applied to extrusion foam molding and other conventional molding processes such as injection molding, blow molding and extrusion molding, and thereby made into various types of molded articles.

The present invention is more specifically explained with reference to the following examples. However, it is to be understood that the present invention is not limited to these examples. In the following examples and comparative examples, all parts are by weight and the procedures for evaluation were as follows.

With respect to the state of a powder of a processing aid for foam molding use, the powder was observed under an optical microscope and its photomicrograph was analyzed by image processing to determine the proportion of particles whose inner part has fused into a homogeneous state. In this connection, the particles whose shell part has completely fused so as to look transparent were regarded as particles whose inner part has fused into a homogeneous state. With respect to the appearance of a foam-molded product, the surface of the molded product was observed and its appearance was considered to be better as it had fewer surface irregularities. With respect to the foamed cell structure of a foam-molded product, a cross section of the foam-molded product was observed. The foaming ratio of a foam-molded product is considered to be higher as its die swell ratio is greater and its specific gravity is smaller.

COMPARATIVE EXAMPLE 1

Using a Henschel mixer, 100 parts of polyvinyl chloride (with an average degree of polymerization of 700), 2.0 parts of methyltin mercaptide, 1.0 part of calcium stearate, 3.0 parts of a lubricant, 10.0 parts of talc, 1.0 part of a foaming agent (azodicarbonamide), and 0.7 part of sodium bicarbonate were blended, and the blending was finished when an internal temperature of 90° C. was reached. Then, using a 30 mm single-screw extruder, this vinyl chloride resin composition was foam-molded to evaluate its processability and foam moldability. The results thus obtained are shown in Table 1.

EXAMPLE 1

A reaction vessel equipped with a stirrer and a reflux condenser was charged with 230 parts of deionized water. After the addition of 1.5 parts of dioctyl sodium sulfosuccinate, the atmosphere within the vessel was replaced with nitrogen. Thereafter, 0.2 part of ammonium persulfate, 0.005 part of n-octyl mercaptan, 70 parts of methyl methacrylate, and 30 parts of n-butyl methacrylate were charged thereinto and heated to 65° C. with stirring. Then, the heating and stirring was continued for 2 hours to complete the polymerization. The resulting emulsion was cooled and then spray-dried at an inlet temperature of 160° C. and an outlet temperature of 70° C. to obtain a polymerization product in powder form. In the powder thus obtained, the content of particles having fused into a homogeneous state was 10% by weight.

Using a Henschel mixer, 15 parts of the aforesaid powder, 100 parts of polyvinyl chloride (with an average degree of polymerization of 700), 2.0 parts of methyltin mercaptide, 1.0 part of calcium stearate, 3.0 parts of a lubricant, 10.0 parts of talc, 1.0 part of a foaming agent (azodicarbonamide), and 0.7 part of sodium bicarbonate were blended, and the blending was finished when an internal temperature of 90° C. was reached. Then, using a 30 mm single-screw extruder, this vinyl chloride resin-based foam molding composition was foam-molded to evaluate its processability and foam moldability. The results thus obtained are shown in Table 1.

It can be seen that the foaming ratio of this composition was markedly improved as compared with the composition of Comparative Example 1 which contained no processing aid for foam molding use. Moreover, the foam-molded product had a uniform cell structure and a good molding appearance.

EXAMPLE 2

The same reaction vessel as used in Example 1 was charged with 230 parts of deionized water. After the addition of 1.5 parts of dioctyl sodium sulfosuccinate, the atmosphere within the vessel was replaced with nitrogen. Thereafter, 0.2 part of ammonium persulfate, 0.005 part of n-octyl mercaptan, 70 parts of methyl methacrylate, and 30 parts of n-pentyl methacrylate were charged thereinto and worked up in the same manner as in Example 1 to obtain a polymerization product in powder form. In the powder thus obtained, the content of particles having fused into a homogeneous state was 20% by weight. Using this polymerization product, a foam molding composition was prepared in the same manner as in Example 1, and then foam-molded to evaluate its processability and foam moldability. The results thus obtained are shown in Table 1.

It can be seen that, similarly to Example 1, the foaming ratio of this composition was markedly improved as compared with the composition of Comparative Example 1 which contained no processing aid for foam molding use. Moreover, the foam-molded product had a uniform cell structure and a good molding appearance.

COMPARATIVE EXAMPLE 2

A polymerization product in powder form was obtained in the same manner as in Example 1, except that 90 parts of methyl methacrylate and 10 parts of n-butyl methacrylate were used. Using this polymerization product, a foam molding composition was prepared in the same manner as in Example 1, and then foam-molded to evaluate its processability and foam moldability. The results thus obtained are shown in Table 1.

Although the foaming ratio of this composition was improved as compared with the composition of Comparative Example 1 which contained no processing aid for foam molding use, the foam-molded product had a partly nonuniform cell structure and a rather poor molding appearance.

COMPARATIVE EXAMPLE 3

A polymerization product was obtained in the same manner as in Example 1, except that 40 parts of methyl methacrylate and 60 parts of n-butyl methacrylate were used. Using this polymerization product, a foam molding composition was prepared in the same manner as in Example 1, and then foam-molded to evaluate its processability and foam moldability. The results thus obtained are shown in Table 1.

Although the foaming ratio of this composition was improved as compared with the composition of Comparative Example 1 which contained no processing aid for foam molding use, the foam-molded product had a nonuniform cell structure and a rather poor molding appearance.

COMPARATIVE EXAMPLE 4

A polymerization product was obtained in the same manner as in Example 1, except that no n-octyl mercaptan was used. Using this polymerization product, a foam molding composition was prepared in the same manner as in Example 1, and then foam-molded to evaluate its processability and foam moldability. The results thus obtained are shown in Table 1.

Although the foaming ratio of this composition was improved as compared with the composition of Comparative Example 1 which contained no processing aid for foam molding use, the foam-molded product had a partly nonuniform cell structure and a rather poor molding appearance.

COMPARATIVE EXAMPLE 5

A polymerization product was obtained in the same manner as in Example 1, except that 0.2 part of n-octyl mercaptan was used. Using this polymerization product, a foam molding composition was prepared in the same manner as in Example 1, and then foam-molded to evaluate its processability and foam moldability. The results thus obtained are shown in Table 1.

Although the foaming ratio of this composition was improved as compared with the composition of Comparative Example 1 which contained no processing aid for foam molding use, the effect was less powerful. Moreover, the foam-molded product had a partly nonuniform cell structure and a poor molding appearance.

EXAMPLE 3

Polymerization was carried out in the same manner as in Example 1. The resulting emulsion was cooled and then spray-dried at an inlet temperature of 200° C. and an outlet temperature of 130° C to obtain a polymerization product in powder form. In the powder thus obtained, the content of particles having fused into a homogeneous state was 45% by weight. Using this polymerization product in powder form, a foam molding composition was prepared in the same manner as in Example 1, and then foam-molded to evaluate its processability and foam moldability. The results thus obtained are shown in Table 1.

COMPARATIVE EXAMPLE 6

Using a Henschel mixer, 35 parts of the powder of the polymerization product obtained in Example 1, 100 parts of polyvinyl chloride (with an average degree of polymerization of 700), 2.0 parts of methyltin mercaptide, 1.0 part of calcium stearate, 3.0 parts of a lubricant, 10.0 parts of talc, 1.0 part of a foaming agent (azodicarbonamide), and 0.7 part of sodium bicarbonate were blended, and the blending was finished when an internal temperature of 90° C. was reached. Then, using a 30 mm single-screw extruder, this vinyl chloride resin-based foam molding composition was foam-molded to evaluate its processability and foam moldability. The results thus obtained are shown in Table 1.

Although the foaming ratio of this composition was improved as compared with the composition of Comparative Example 1 which contained no processing aid for foam molding use, the foam-molded product had a nonuniform cell structure and a poor molding appearance.

| | Composition of copolymer | | Reduced viscosity of copolymer ($\eta_{sp}/c$) | Particles having fused into a homogeneous state (wt. %) | Amount of copolymer used (parts) | Appearance of foam-molded product | Foaming ratio | | Cell structure |
|---|---|---|---|---|---|---|---|---|---|
| | Type of monomers | Amounts (parts) | | | | | Die swell ratio (%) | Specific gravity (g/cm³) | |
| Example 1 | MMA<br>BMA | 70<br>30 | 6.5 | 10 | 15 | Good | 282 | 0.46 | Uniform |
| Example 2 | MMA<br>PEMA | 70<br>30 | 6.4 | 20 | 15 | Good | 274 | 0.47 | Uniform |

-continued

| | Composition of copolymer | | Reduced viscosity of copolymer ($\eta_{sp}/c$) | Particles having fused into a homogeneous state (wt. %) | Amount of copolymer used (parts) | Appearance of foam-molded product | Foaming ratio | | Cell structure |
|---|---|---|---|---|---|---|---|---|---|
| | Type of monomers | Amounts (parts) | | | | | Die swell ratio (%) | Specific gravity (g/cm³) | |
| Example 3 | MMA | 70 | 6.5 | 45 | 15 | Good | 260 | 0.48 | Uniform |
| | BMA | 30 | | | | | | | |
| Comparative Example 1 | None | — | — | — | — | Rather poor | 120 | 1.07 | Non-uniform |
| Example 2 | MMA | 90 | 6.7 | 10 | 15 | Rather poor | 273 | 0.44 | Rather non-uniform |
| | BMA | 10 | | | | | | | |
| Example 3 | MMA | 40 | 6.3 | 13 | 15 | Poor | 235 | 0.52 | Non-uniform |
| | BMA | 60 | | | | | | | |
| Example 4 | MMA | 70 | 9.2 | 10 | 15 | Rather poor | 322 | 0.41 | Rather non-uniform |
| | BMA | 30 | | | | | | | |
| Example 5 | MMA | 70 | 2.7 | 10 | 15 | Good | 180 | 0.75 | Rather non-uniform |
| | BMA | 30 | | | | | | | |
| Example 6 | MMA | 70 | 6.5 | 10 | 35 | Rather poor | 328 | 0.39 | Non-uniform |
| | BMA | 30 | | | | | | | |

MMA: Methyl methacrylate
BMA: n-Butyl methacrylate
PEMA: n-Pentyl methacrylate

The processing aid for foam molding use in accordance with the present invention permits vinyl chloride resin-based foam molding compositions to be kneaded efficiently and imparts an increased melt strength thereto, so that fine and uniform foamed cells can be formed, a high foaming ratio can be achieved, and an attractive molding appearance can be produced. Moreover, when this processing aid for foam molding use comprises a powder formed by spray drying so that the proportion of particles whose inner part has fused into a homogeneous state is less than 50% by weight, molded products having a uniform cell structure can be obtained even at a high foaming ratio.

What is claimed is:

1. A processing aid (B) for foam molding use which comprises a powdered copolymer obtained by the polymerization of 50 to 80% by weight of methyl methacrylate, 20 to 50% by weight of an alkyl methacrylate having an alkyl group of 3 to 5 carbon atoms, and 0 to 20% by weight of other copolymerizable monomers, the copolymer having a reduced viscosity ($\eta_{sp}/c$) of 4 to 8.

2. A processing aid (B) for foam molding use as claimed in claim 1 which has been formed into a powder by spray drying.

3. A processing aid (B) for foam molding use as claimed in claim 1 or 2 wherein less than 50% by weight of the powder comprises particles whose inner part has fused into a homogeneous state.

4. A vinyl chloride resin-based foam molding composition comprising 100 parts by weight of a vinyl chloride resin (A) and 1 to 25 parts by weight of a processing aid (B) for foam molding use as claimed in claim 1.

5. A vinyl chloride resin-based foam molding composition as claimed in claim 4 wherein the vinyl chloride resin (A) has an average degree of polymerization of 300 to 5,000.

6. A foam-molded product formed from a vinyl chloride resin-based foam molding composition as claimed in claim 5.

7. A vinyl chloride resin-based foam molding composition comprising 100 parts by weight of a vinyl chloride resin (A) and 1 to 25 parts by weight of a processing aid (B) for foam molding use as claimed in claim 2.

8. A vinyl chloride resin-based foam molding composition comprising 100 parts by weight of a vinyl chloride resin (A) and 1 to 25 parts by weight of a processing aid (B) for foam molding use as claimed in claim 3.

* * * * *